United States Patent
Wang et al.

(10) Patent No.: US 9,564,757 B2
(45) Date of Patent: Feb. 7, 2017

(54) METHOD AND APPARATUS FOR OPTIMIZING A HYBRID POWER SYSTEM WITH RESPECT TO LONG-TERM CHARACTERISTICS BY ONLINE OPTIMIZATION, AND REAL-TIME FORECASTS, PREDICTION OR PROCESSING

(71) Applicant: EATON CORPORATION, Cleveland, OH (US)

(72) Inventors: Yigang Wang, Maple Grove, MN (US); Neha Mishra, Pune (IN)

(73) Assignee: EATON CORPORATION, Cleveland, OH (US)

( * ) Notice: Subject to any disclaimer, the term of this patent is extended or adjusted under 35 U.S.C. 154(b) by 884 days.

(21) Appl. No.: 13/936,374

(22) Filed: Jul. 8, 2013

(65) Prior Publication Data

US 2015/0012144 A1    Jan. 8, 2015

(51) Int. Cl.
*H02J 3/00* (2006.01)
*H02J 3/14* (2006.01)
(Continued)

(52) U.S. Cl.
CPC ............... *H02J 3/387* (2013.01); *H02J 3/00* (2013.01); *H02J 3/008* (2013.01); *H02J 3/32* (2013.01);
(Continued)

(58) Field of Classification Search
CPC ............. H02J 3/00; H02J 3/008; H02J 3/14; H02J 3/32; H02J 3/383; H02J 3/386; H02J 3/387; H02J 2003/003; H02J 2003/007; Y02E 10/563; Y02E 10/566; Y02E 10/763; Y02E 60/76; Y02E 70/30; Y04S 10/54; Y04S 40/22; Y04S 50/10
See application file for complete search history.

(56) References Cited

U.S. PATENT DOCUMENTS 6,064,916 A  *  5/2000  Yoon ................... G05B 13/048
                                                    700/29
7,116,010 B2    10/2006  Lasseter et al.
(Continued)

FOREIGN PATENT DOCUMENTS

CN        101976851 A       2/2011
CN        102122819 A       7/2011
(Continued)

OTHER PUBLICATIONS

D. Gao et al., "Energy management strategy based on fuzzy logic for a fuel cell hybrid bus", Journal of Power Sources, 185(1), Oct. 2008, pp. 311-317.
Z. Jiang et al., "Design and experimental tests of control strategies for active hybrid fuel cell/battery power sources", Journal of Power Sources, 130(1), May 2004, pp. 163-171.
(Continued)

*Primary Examiner* — Robert Fennema
*Assistant Examiner* — Jennifer L Norton
(74) *Attorney, Agent, or Firm* — Eckert Seamans; Grant Coffield

(57) ABSTRACT

An apparatus optimizes a hybrid power system with respect to long-term characteristics of the hybrid power system. The apparatus includes a real-time controller of the hybrid power system and a processor. The processor cooperates with the real-time controller and is structured to input current measurements of information from the hybrid power system and hybrid dynamics information including continuous dynamics and discrete time dynamics that model the hybrid power system. The processor provides online optimization of the hybrid power system based upon the input, and outputs a
(Continued)

power flow reference and a number of switch controls to the real-time controller based upon the online optimization. The processor is further structured to provide at least one of: real-time forecasts or real-time prediction of future information operatively associated with the hybrid power system as part of the input, and real-time processing of the online optimization.

18 Claims, 14 Drawing Sheets

(51) Int. Cl.
   *H02J 3/38* (2006.01)
   *H02J 3/32* (2006.01)

(52) U.S. Cl.
   CPC ............... *H02J 3/383* (2013.01); *H02J 3/386* (2013.01); *H02J 3/14* (2013.01); *H02J 2003/003* (2013.01); *H02J 2003/007* (2013.01); *Y02E 10/563* (2013.01); *Y02E 10/566* (2013.01); *Y02E 10/763* (2013.01); *Y02E 60/76* (2013.01); *Y02E 70/30* (2013.01); *Y04S 10/54* (2013.01); *Y04S 40/22* (2013.01); *Y04S 50/10* (2013.01)

(56) References Cited

U.S. PATENT DOCUMENTS

| | | | |
|---|---|---|---|
| 7,715,950 B2 | 5/2010 | Lasseter et al. | |
| 7,787,272 B2 | 8/2010 | Lasseter et al. | |
| 7,920,942 B2 | 4/2011 | Lasseter et al. | |
| 7,932,637 B2 | 4/2011 | Lasseter et al. | |
| 7,979,380 B2 * | 7/2011 | Moyne ................ | G05B 13/048 700/28 |
| 8,280,656 B2 * | 10/2012 | Kreiss ................... | G06Q 50/06 324/522 |
| 2002/0049920 A1 * | 4/2002 | Staiger ................. | G06F 1/3203 713/340 |
| 2007/0142975 A1 * | 6/2007 | Piche ...................... | H02J 3/38 700/286 |
| 2008/0208778 A1 * | 8/2008 | Sayyar-Rodsari ... | G05B 13/042 706/12 |
| 2009/0222108 A1 * | 9/2009 | Lou ........................ | G05B 13/04 700/29 |
| 2012/0029897 A1 * | 2/2012 | Cherian ................... | H02J 3/00 703/18 |
| 2014/0149101 A1 * | 5/2014 | Huang .................... | G06F 17/50 703/18 |
| 2014/0293494 A1 * | 10/2014 | Allen ................... | H02H 1/0092 361/93.1 |
| 2015/0081129 A1 * | 3/2015 | Xu ......................... | G05B 15/02 700/297 |
| 2015/0134135 A1 * | 5/2015 | Wong ....................... | H02J 3/38 700/295 |

FOREIGN PATENT DOCUMENTS

| | | |
|---|---|---|
| JP | 2006-320082 A | 11/2006 |
| WO | 01/61820 A1 | 8/2001 |
| WO | 2007/052349 A1 | 10/2007 |
| WO | 2012/058114 A2 | 5/2012 |

OTHER PUBLICATIONS

M. Uzunoglu et al., "Modeling, control and simulation of a PV/FC/UC based hybrid power generation system for stand-alone applications", Renewable Energy, 34(3), Mar. 2009, pp. 509-520.

A. Hajizadeh et al., "Intelligent power management strategy of hybrid distributed generation system", International Journal of Electrical Power & Energy Systems, 29(10), Dec. 2007, pp. 783-795.

G. Tina et al., "Hybrid solar/wind power system probabilistic modelling for long-term performance assessment", Solar Energy, 80(5), May 2006, pp. 578-588.

Z. Jiang, "A Multi-Agent Based Power Sharing Scheme for Hybrid Power Sources", Vehicle Power and Propulsion Conference, VPPC 2007, IEEE, 2007, pp. 7-11.

J. Lagorse et al., "A multi-agent system for energy management of distributed power sources", Renewable Energy, 35(1), Jan. 2010, pp. 174-182.

A. Del Real et al., "Hybrid Model Predictive Control of a Two-Generator Power Plant Integrating Photovoltaic Panels and a Fuel Cell", 46th IEEE Conference on Decision and Control, Dec. 2007, pp. 5447-5452.

A. Bemporad et al., "Control of systems integrating logic, dynamics, and constraints", Automatica 35, Mar. 1999, pp. 407-427.

P. Julian et al., "Canonical Piecewise-Linear Approximation of Smooth Functions", IEEE Transactions on Circuits and Systems, I: Fundamental Theory and Applications, vol. 45, No. 5, May 1998, pp. 567-571.

F. Borrelli et al., "Dynamic programming for constrained optimal control of discrete-time linear hybrid systems", Automatica 41, 2005, pp. 1709-1721.

G. Ferrari-Trecate et al., "Moving Horizon Estimation for Hybrid Systems", IEEE Transactions on Automatic Control, vol. 47, No. 10, Oct. 2002, pp. 1663-1676.

Aktarujjaman, M., et al., "Control Stabilisation of an Islanded System with DFIG Wind Turbine", IEEE, First International Power and Energy Conference, Nov. 28-29, 2006, pp. 312-317.

Jeon, J., et al., Unified Compensation Control of a Hybrid Energy Storage System for Enhancing Power quality and Operation Efficiency in a Diesel and Wind-Turbine Based Stand-alone Microgrid, 3rd IEEE International Symposium on Power Electronics for Distributed Generation Systems (PEDG), 2012, pp. 264-270.

Ninad, N., et al., "Per-Phase DQ Control of a Three-Phase Battery Inverter in a Diesel Hybrid Mini-Grid Supplying Single-Phase Loads", IEEE, 2011, pp. 204-209.

Tian, S., et al., "The Control Strategy Based on Improved Droop Method of Microgrid-Connected Inverters", IEEE, 2010 International Conference on Electrical and Control Engineering, 2010, pp. 5700-703.

Guerrero, J., et al., "Advanced Control Architectures for Intelligent Microgrids-Part II: Power Quality, Energy Storage, and AC/DC Microgrids", IEEE Transactions on Industrial Electronics, vol. 60, No. 4, Apr. 2013, pp. 1263-1270.

Ito, Y., et al., "A Control Method for Small-Scale DC Power Systems Including Distributed Generators", Electrical Engineering in Japan, vol. 167, No. 2, 2009, pp. 86-93.

Chung, I., et al., "Control parameter optimization for multiple distributed generators in a microgrid using particle swarm optimization", Special Issue Article, http://onlinelibrary.wiley.com/doi/10.1002/etep.424/full, 2010, 27 pp.

* cited by examiner

METHOD AND APPARATUS FOR OPTIMIZING A HYBRID POWER SYSTEM WITH RESPECT TO LONG-TERM CHARACTERISTICS BY ONLINE OPTIMIZATION, AND REAL-TIME FORECASTS, PREDICTION OR PROCESSING

BACKGROUND

Field

The disclosed concept pertains generally to hybrid power systems and, more particularly, to apparatus for optimizing such hybrid power systems. The disclosed concept further pertains to methods for optimizing hybrid power systems.

Background Information

Buildings are responsible for over 70% of the U.S. electricity consumption, 40% of the total U.S. energy consumption, and an equivalent fraction of carbon emissions. However, the development and deployment of energy efficient technology in buildings lags behind that of the transportation and industrial sectors. The reasons for this discrepancy include the wide diversity of energy-consuming and energy-saving technologies in buildings. The energy consumption of buildings involves a wide range of different technologies. Space conditioning systems (e.g., HVAC) deliver heating, cooling, and air circulation/cleansing. Lighting systems deliver illumination; water heating and sanitation systems deliver and dispose of water; electrical and gas systems deliver power and fuel; elevators and escalators provide mobility; and integrated renewable systems generate power.

Since fossil energy resources are gradually depleted and are an increasingly serious issue of environmental pollution, it has become the consensus of most countries in the world to develop renewable energy represented by wind energy and solar energy for the sustainable development of human society. Both solar-based and wind-based energy are effective after decades of development, but neither are free of issues. The most notable issue is the possible lack of wind or sun, which will prevent power generation. The best solution to this problem is to create a hybrid power system, which is a combination of two or more different power sources. Combining two or more power sources will make for a much more steady production of power, with less potential for outages in case one source of power is lacking. In order to draw the best performance of such systems, proper energy management is essential.

Hybrid power source management should first ensure continuous power supply to the load. Thereafter, other targets may be set (e.g., fault tolerance of an element; maximizing efficiency; reducing operating cost). Hybrid power sources are also used beyond residential/commercial building areas. They have been successfully used to power hybrid electric vehicles using selected combinations of internal combustion engines, fuel cells, batteries and supercapacitors. They are further deployed in all-electric ships to build a distributed shipboard electric power system. They can also be used in a bulk power system to construct an autonomous distributed energy unit.

A suitable control strategy takes advantage of inherent scalability and robustness benefits of the hybrid power system. Traditionally, heuristic control strategies are used in energy management. The control strategies are based on an "if-then-else" type of control rules, which determine, for example, which power source is employed. Fuzzy logic algorithms are known to determine fuel cell output power depending on external power requirements and battery state-of-charge. Since heuristic control strategies do not require models of systems, they are relatively easy to design and implement.

In most buildings, diverse loads operate largely independently. For instance, space conditioning systems, lacking coordinated controls, can simultaneously heat and cool building air, dramatically increasing energy use. Enhancing the integration of these diverse systems, expanding their coordinated operation through distributed sensor and control networks, and ensuring they are maintained in optimal working condition, can lead to important efficiency gains. Load management could be introduced to prevent conflicting simultaneous operation of heating and cooling systems and unnecessary space conditioning, lighting and mobility services. Hence, intelligent load management should also be included in the control strategies of hybrid power systems.

Modeling of a hybrid power system is needed to manage both power sources and different loads to achieve maximum efficiency of an entire building. A known probabilistic model allows estimation of the long-term average performance of a hybrid solar-wind power system. A closed form solution approach can be employed to convolute the wind energy and the photovoltaic system. For short term performance, only a deterministic formulation can be used. Since the hybrid power system consists of different power sources and loads, it is intuitive to treat the system as a network. A multi-agent technology has been successfully applied in manufacturing, transportation, and many other fields, and can also be applied to manage power sharing between multiple sources and loads in a hybrid power system. In a multi-agent based hybrid power system, each energy source and load is represented as an autonomous agent that provides a common communication interface for all different components. With this structure, distributed control, with decision-making done locally within each power source and load, can facilitate coordination of the agents and potentially create a scalable and robust hybrid power system. If an agent goes off-line, other agents are able to cope with the loss of that agent and re-organize the system.

Although multi-agent system modeling has many advantages, centralized management, which is also known as a "top-down" approach, seems preferable for many applications. The reason is there are relatively mature control/optimization theories available for centralized-based decision making. Also, centralized decision making is usually more efficient as compared with a de-centralized counterpart, and it results in relatively simple rules established according to the constraints and objectives. A hierarchical system control divides the decision-making process into different levels, in which only some of them in a straight line access the control system. The decision-maker units that define tasks and coordinate are at a higher level of the hierarchy, while the lower levels have direct contact with the process. For a hybrid power system, the energy management unit could be treated as a relatively higher level decision-maker, and the control systems that regulate the voltage and current of the system are then treated as lower level units. The presence of switching modes and the constraints of power sources and loads make the problem inherently have continuous and discrete dynamic behavior, which can be modeled and controlled under hybrid control theory.

A hybrid model of a dynamic system describes the interaction between continuous dynamics described by differential equations, and logical components described by finite state machines, IF-THEN-ELSE rules, and propositional and temporal logic. Several classes of hybrid systems have been proposed, such as Discrete Hybrid Automata (DHA), Mixed Logical Dynamical (MLD) models, Piecewise Linear (PWA) systems, and max-min-plus-scaling (MMPS) systems. However, it is believed that all of those modeling frameworks are equivalent under some hypothesis and it is possible to represent the same system with different models.

In a hybrid power system, the term "hybrid" means the combination of different power sources and loads. In hybrid control theory, the term "hybrid" means the combination of continuous dynamics and logic components.

Based on the hybrid model of control, reachability analysis and piecewise quadratic Lyapunov stability are standard tools for hybrid system analysis. Reachability analysis, or safety analysis or formal verification, aims at detecting if a hybrid model will eventually reach an unsafe state configuration or satisfy a temporal logical formula. Reachability analysis relies on a reach set computation algorithm, which is strongly related to the mathematical model. Piecewise quadratic Lyapunov stability is often used to prove the stability of the hybrid system. The computational burden is usually low but it produces conservative results due to the convex relaxation of the problem.

In addition to the mathematical modeling of a hybrid system, system identification techniques for piecewise affine (i.e., can be described by a type of format: "ax+b") systems are also known that allow derivation of models from input-output data.

Different methods for the analysis and design of controllers for hybrid systems are known. The approaches differ greatly in the hybrid models adopted, in the formulation of the optimal control problem and in the method used to solve it. The state-feedback optimal control law can be constructed by combining multi-parametric programming and dynamic programming. A model predictive control scheme is known to stabilize Mixed Logical Dynamical (MLD) systems on desired reference trajectories while fulfilling operating constraints. Similarly, the dual problem of state estimation is known to admit a receding horizon solution scheme.

A micro-grid energy management system is a supervisory control system to manage power flow to optimize the operation of a micro-grid, for example, by minimizing the fuel consumption of generators. The nature of a micro-grid makes traditional numerical optimization techniques, such as linear programming and nonlinear programming, not applicable. The traditional optimization method is based on continuous functions, such as differential equations. However, a micro-grid, by nature, has many "discrete" modes or components, such as the modes of operation of generators, and switches. In reality, many approximations have to be made to use numerical optimization techniques. Of course, those will lose optimality during approximation.

Known micro-grid long-term power management is based on an "if-then-else" type heuristic control strategy. However, a heuristic control strategy is an experience-based method and, as a result, the maximum efficiency is not guaranteed.

There is room for improvement in apparatus for optimizing hybrid power systems.

There is also room for improvement in methods for optimizing hybrid power systems.

SUMMARY

These needs and others are met by embodiments of the disclosed concept in which a hybrid system framework models a hybrid power system (e.g., without limitation, a micro-grid system) with respect to long-term characteristics, which consist of both continuous and discrete time dynamics, which is a "hybrid dynamics" problem.

The disclosed concept employs a hybrid model predictive control (MPC) to solve this problem. The "hybrid dynamics" formulation of the disclosed concept captures both continuous dynamics (e.g., without limitation, differential equations) and discrete dynamics (e.g., without limitation, switch status; mode switching). The optimal performance is achieved by using online optimization with hybrid dynamics formulation. This approach can enjoy another advantage from the MPC type control. If suitable future information (e.g., without limitation, load; weather is employed), then better performance can be achieved.

Based on the hybrid framework, an online optimization based supervisory control strategy, or hybrid predictive control, is employed to achieve maximum efficiency. Maximum efficiency is provided based on current measurements and further improvements in micro-grid efficiency are provided by incorporating real-time forecasts and prediction of future information, such as weather forecasts and future power load information, in order to provide further improvements in the efficiency of micro-grid supervisory control.

In accordance with one aspect of the disclosed concept, an apparatus optimizes a hybrid power system with respect to long-term characteristics of the hybrid power system. The apparatus comprises: a real-time controller of the hybrid power system; and a processor cooperating with the real-time controller, the processor being structured to input current measurements of information from the hybrid power system and hybrid dynamics information including continuous dynamics and discrete time dynamics that model the hybrid power system, provide online optimization of the hybrid power system based upon the input, and output a power flow reference and a number of switch controls to the real-time controller based upon the online optimization, wherein the processor is further structured to provide at least one of: real-time forecasts or real-time prediction of future information operatively associated with the hybrid power system as part of the input, and real-time processing of the online optimization.

As another aspect of the disclosed concept, a method of optimizing a hybrid power system with respect to long-term characteristics of the hybrid power system comprises: inputting current measurements of information from the hybrid power system and hybrid dynamics information including continuous dynamics and discrete time dynamics that model the hybrid power system; providing online optimization of the hybrid power system with a processor based upon the inputting; outputting a power flow reference and a number of switch controls to a real-time controller based upon the online optimization; and providing at least one of: real-time forecasts or real-time prediction of future information operatively associated with the hybrid power system as part of the inputting, and real-time processing of the online optimization.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a controller; a workstation; a personal computer; a microprocessor; a microcontroller; a microcomputer; a central processing unit; a mainframe computer; a mini-computer; a server; a networked processor; or any suitable processing device or apparatus.

The disclosed concept is described in association with a micro-grid system, although the disclosed concept is applicable to a wide range of hybrid power systems, such as for example and without limitation, hybrid electric vehicles, hybrid hydraulic vehicles, and distributed shipboard electric power systems.

Figure 1:
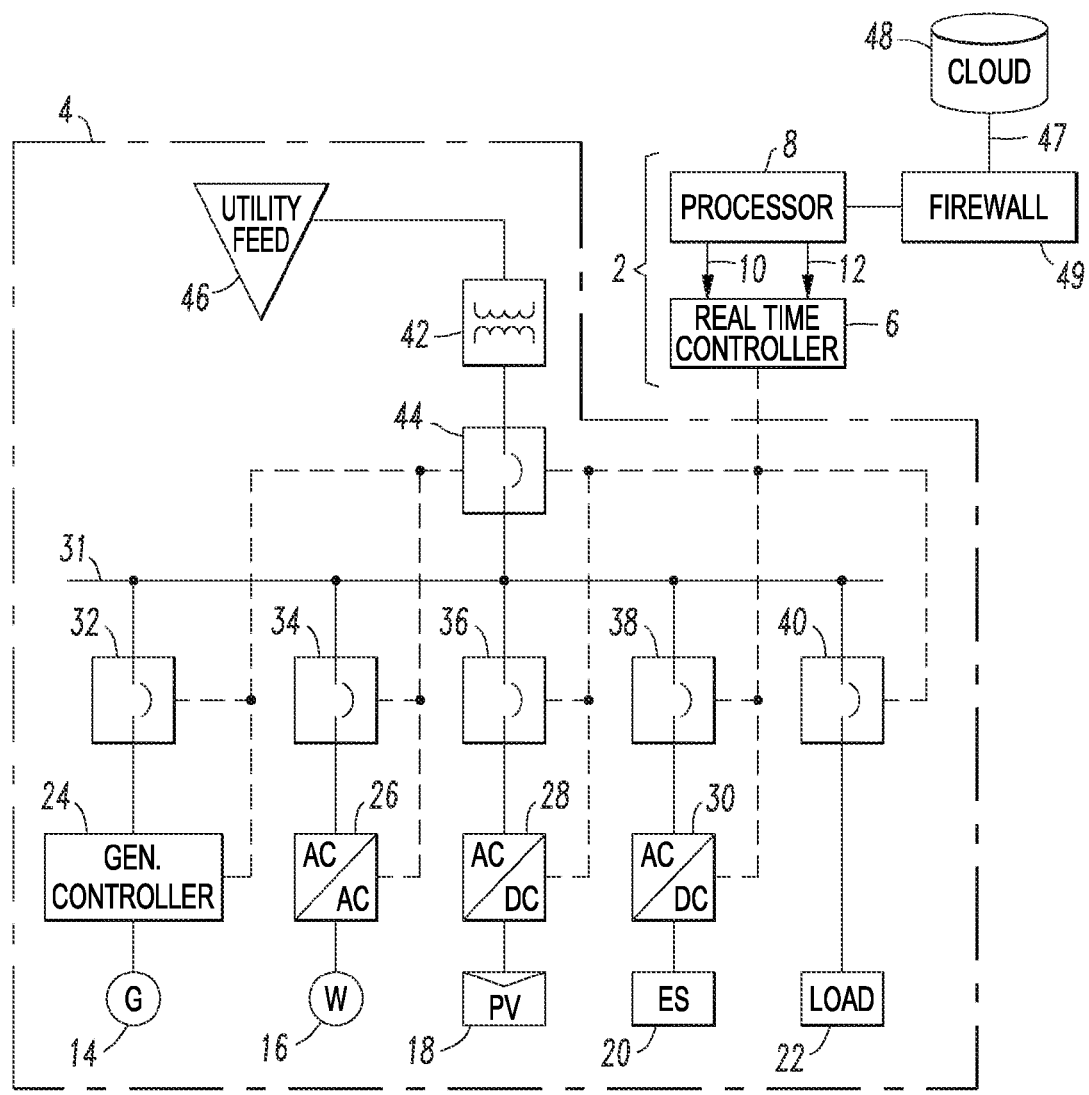
FIG. 1 is a block diagram of an apparatus for optimizing a hybrid power system with respect to long-term characteristics in accordance with embodiments of the disclosed concept.

Referring to FIG. 1, an apparatus 2 optimizes a hybrid power system, such as the example micro-grid system 4, with respect to long-term characteristics thereof. The apparatus 2 includes a real-time controller 6 of the system 4, and a processor 8 cooperating with the real-time controller 6. As will be described in connection with FIG. 2, the processor 8 is structured to input current measurements of information from the system 4 and hybrid dynamics information (e.g., hybrid model predictive control; hybrid system framework) including continuous dynamics and discrete time dynamics that model the system 4, provide online optimization of the system 4 based upon this input, and output a power flow reference 10 and a number of switch controls 12 to the real-time controller 6 based upon the online optimization. The processor 8 is further structured to provide at least one of: (1) real-time forecasts or real-time prediction of future information operatively associated with the system 4 as part of the input, and (2) real-time processing (as will be discussed, below, in connection with FIG. 11) of the online optimization.

For example, a traditional numerical solver is not suitable for online optimization of a hybrid power system, such as 4, since its computational time grows exponentially as the problem size increases. In the disclosed concept, the computation time is dramatically reduced by reducing control horizons. Instead, the computation time increases linearly with system size, which makes system online optimization possible.

In FIG. 1, the example micro-grid system 4 includes a plurality of different power sources, such as a generator (G) 14, a wind turbine (W) 16, a photovoltaic power source (PV) 18, and bi-directional energy storage (ES) 20, which can source and sink power, as well as a number of micro-grid loads 22. The power sources are controlled by the real-time controller 6, which can include a number of dedicated controllers, such as a generator controller 24 for the generator 14, an AC/AC converter and controller 26 for the wind turbine 16, and AC/DC converters and controllers 28,30 for the respective photovoltaic power source 18 and energy storage 20. The various power sources 14,16,18,20 feed a common bus 31 through respective switches 32,34, 36,38, which are also controlled by the real-time controller 6. Another switch 40, which is also controlled by the real-time controller 6, selectively powers the number of loads 22. The common bus 31 is selectively connected to a transformer 42 by a further switch 44, which is also controlled by the real-time controller 6. In turn, the transformer 42 interfaces a utility feed 46.

The processor 8 can provide the real-time forecasts or the real-time prediction of future information as part of the input, in order to improve long-term efficiency and performance of the system 4. The discrete time dynamics can consist of discrete switch status and discrete mode switching information. The continuous dynamics can include differential equations. The future information can include one or more of weather forecasts, future electricity price information, and future load demand information, such as, for example and without limitation, future information 47 from cloud 48 through firewall 49.

Given a particular hybrid power system architecture, the apparatus 2 optimizes operations of the system 4 based on real-time measurement and prediction of load and environment. The system-wide control solution fully utilizes renewable energy sources and achieves maximum efficiency.

Some weather information, such as sun emissions and wind speed, is periodic and/or predictable. Also, the electrical loads, such as 22, are often periodic and predictable. For example, the power consumption of a commercial building has a strong periodic pattern, and has a strong relationship with certain conditions, such as outside temperature. All of this future information can be online updated and utilized in online optimization to maximize system efficiency.

Figure 2:
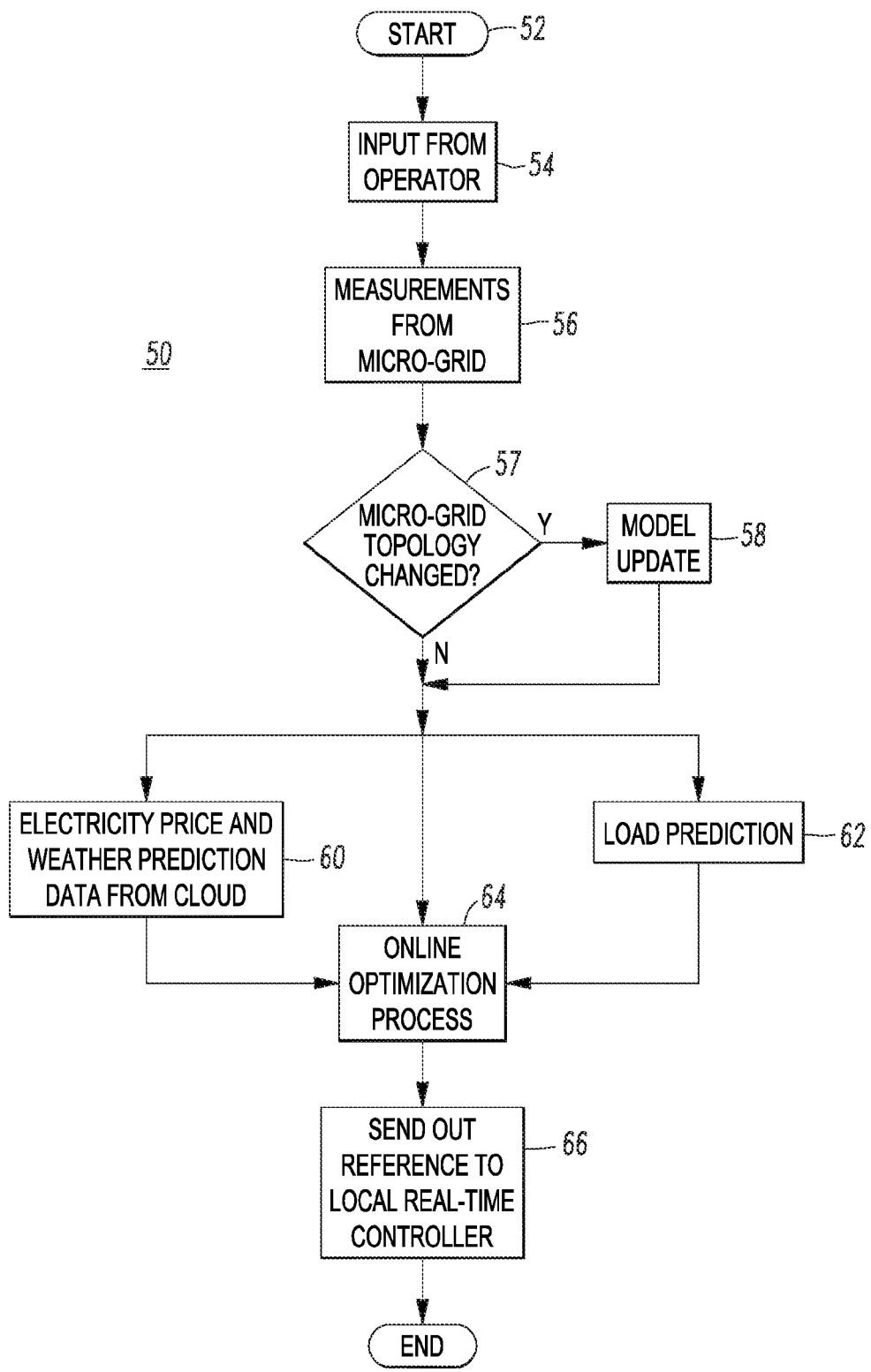
FIG. 2 is a flowchart of a supervisory control routine of the processor of FIG. 1.

FIG. 2 shows the overall process of supervisory control routine 50 of a hybrid power system, such as the example micro-grid system 4 of FIG. 1 as executed by the processor 8, which can be a supervisory controller. After starting at 52, the routine 50 reads input, such as commands, from an operator at 54, and measurements, such as sensor readings, from the micro-grid system 4 at 56 to make sure that the topology of the system 4 has not been changed. If the system topology has changed at 57, then the model is updated accordingly at 58. The system changes could be, for example and without limitation, adding more components, or employing a different power and communication topology. The processor 8 senses the topology changes to make correct decisions.

Some of the future information, such as real-time electricity prices or weather forecasts, can come from the cloud at 60, and some of them, such as future load information, can come from local prediction algorithms at 62. Then, at 64, system topology, sensor measurements and predicted future information are sent to an online optimizer (numerical solver 100 of FIG. 4). Finally, at 66, a number of command signals are sent out to the lower level real-time controller 6 of FIG. 1. At each suitable time step, this routine 50 is repeated until it is stopped by an operator.

Figure 3:
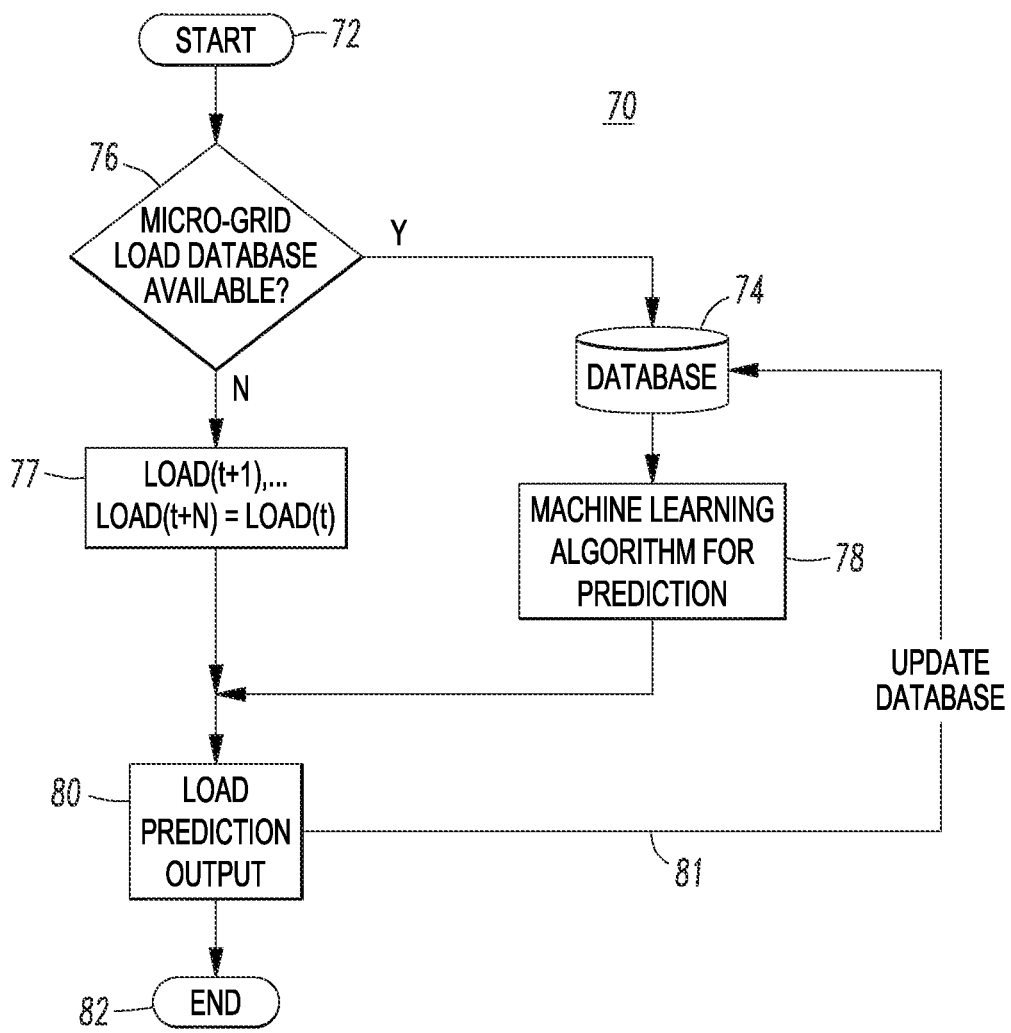
FIG. 3 is a flowchart of a load prediction routine of the supervisory control routine of FIG. 2.

FIG. 3 shows the process of a load prediction sub-routine 70, which corresponds to step 62 of FIG. 2. The sub-routine 70 starts at 72. Then, if a micro-grid load database 74 is not available at 76, then a future N-step prediction of the load at time t+1 (load(t+1)) through time t+N (load(t+N)), wherein N is a suitable positive integer, just repeats at 77 the current status of the load at time t (load(t)), in order to keep the system 4 running Otherwise, for the normal condition, the database 74 has stored the past status and keeps updating as the system 4 runs. A machine learning algorithm 78, such as a neural network or statistical learning, is used to predict the next N-step status of the load. For example, the real-time prediction of future information can include at least one of load demand prediction, electricity price prediction, and weather prediction. After either 77 or 78, the load prediction is output at 80, which also causes an update 81 of the database 74, before the sub-routine 70 ends at 82. The load prediction output 80 includes a plurality of load values with respect to time and a load prediction output.

Figure 4:
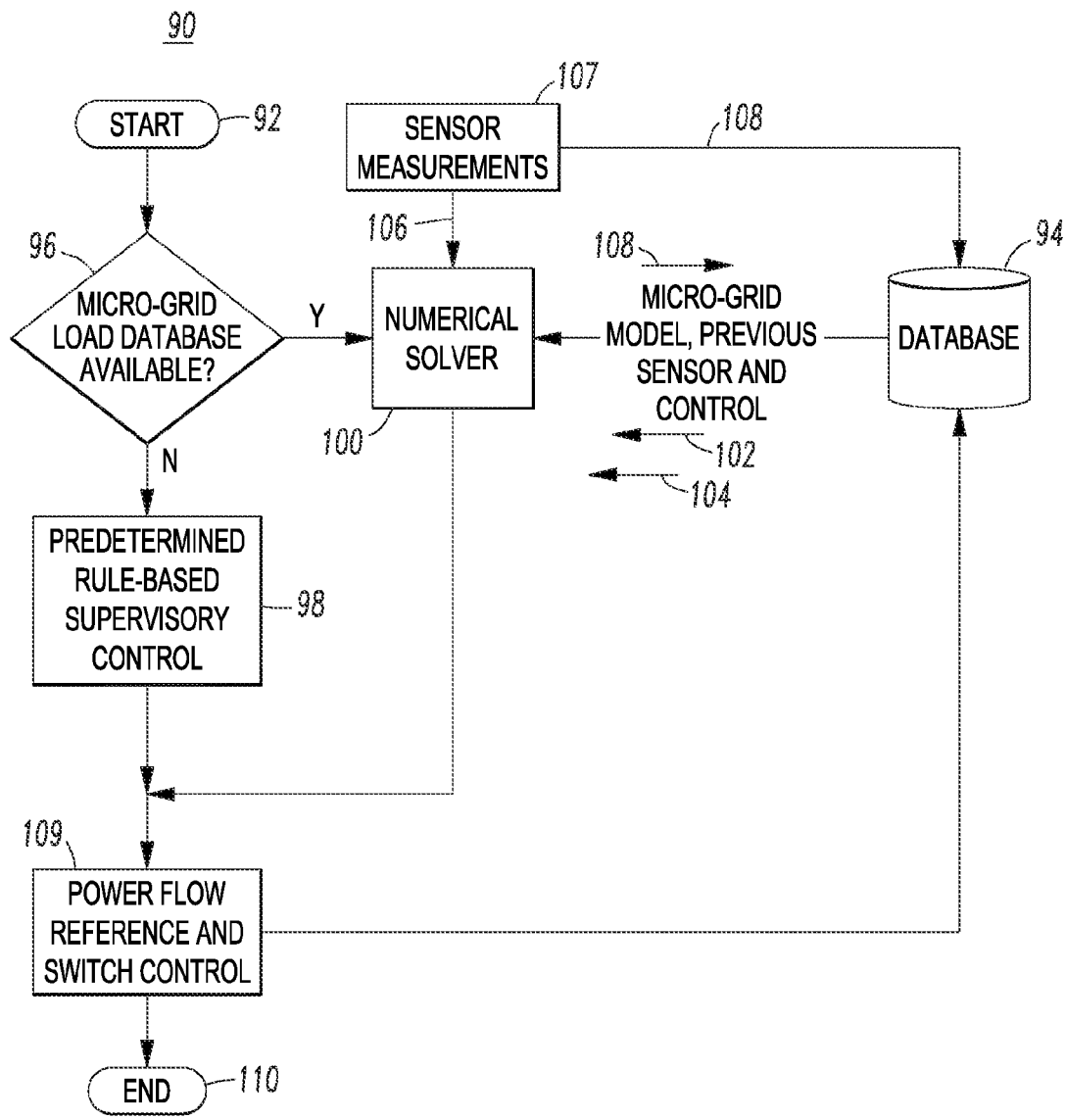
FIG. 4 is a flowchart of an online optimization routine of the supervisory control routine of FIG. 2.

FIG. 4 shows the process of an online optimization sub-routine 90 of supervisory control of a hybrid power system, such as the example micro-grid system 4 of FIG. 1. The sub-routine 90 starts at 92. If a supervisory system database 94 is not available at 96, then the system 4 will be running using predetermined rule-based supervisory control to maintain functionality of the system 4 at 98. Otherwise, if the database 94 is available, then the online optimization mode is enabled for the numerical solver 100. With this mode, pre-stored system architecture information 102 and weather forecast data 104 are fed to the numerical solver 100 for the online optimization sub-routine 90, together with a plurality of sensor readings 106 (e.g., a plurality of discrete and continuous sensor measurements 107, such as a plurality discrete values, such as the status of switches, and power flow) of the example system 4. The numerical solver 100 computes the optimal power flow references and the switch status for output. All the status of the current step is stored back to the database 94 at 108 for future usage. After either 98 or 100, the power flow reference and the switch control are output to the real-time controller 6 (FIG. 1) at 109 after which the sub-routine 90 ends at 110.

EXAMPLE 1

Figure 5A:
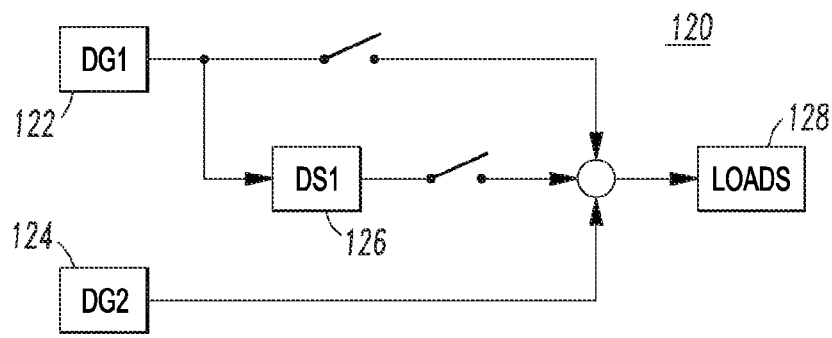
FIG. 5A is a block diagram of a simple micro-grid.
Figure 5B:
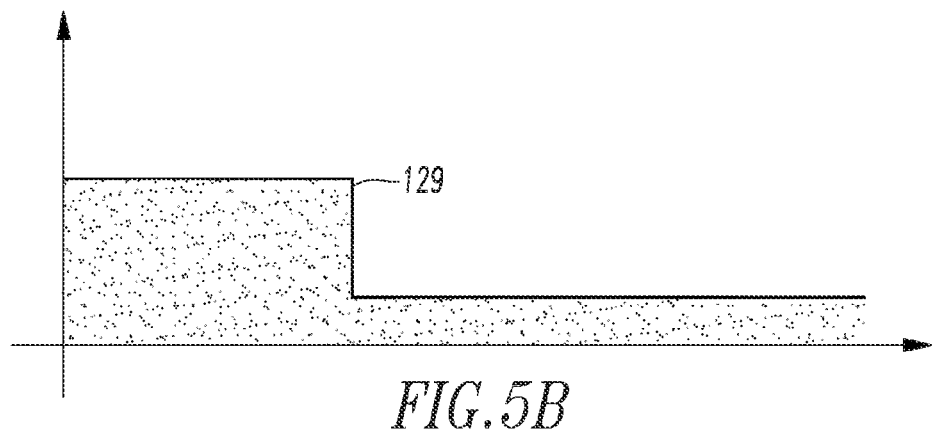
FIG. 5B is a plot of an output power limit curve versus time for one of the distributed generators of FIG. 5A.
Figure 5C:
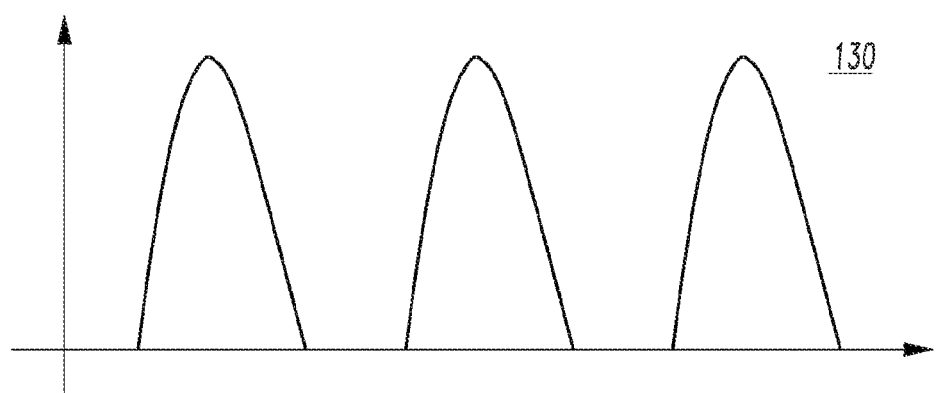
FIG. 5C is a plot of a load curve versus time for the simple micro-grid of FIG. 5A.

FIG. 5A shows a simple micro-grid system 120. A wind turbine DG1 122 can provide "free" power, but is not available all the time. A power grid DG2 124, which is normally always available, does have some cost. A battery DS1 126 already has some power stored, and could be charged and discharged based on needs. The loads 128 have to be supplied all the time, from DG1 122, DS1 126 and/or DG2 124. The DG1 122 output power limit curve 129 is shown in FIG. 5B. The load curve 130 is shown in FIG. 5C.

In this example, the goal of control is to meet the load requirement (FIG. 5C) and to minimize the cost. The control freedom includes providing power from DG1 122, DG2 124 and/or DS1 126, charging power to DS1 126, switching of DG1 122, and/or switching of DS1 126.

Figure 6A:
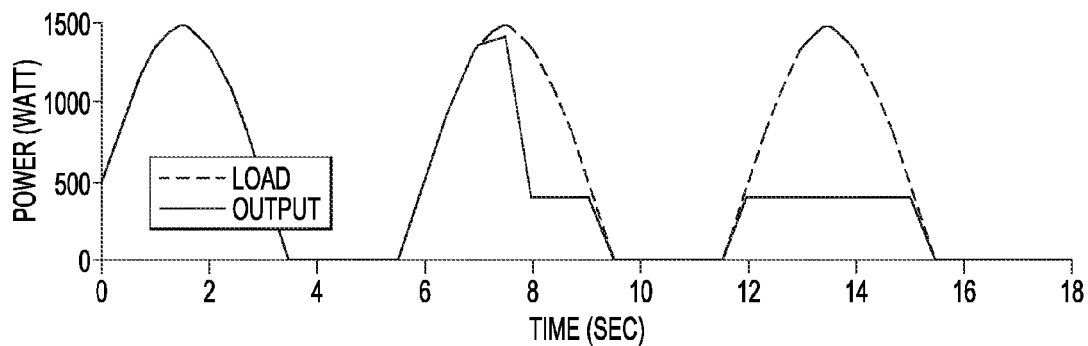
FIGS. 6A-6C are plots of power, switch state and state of charge versus time for a micro-grid system.
Figure 6B:
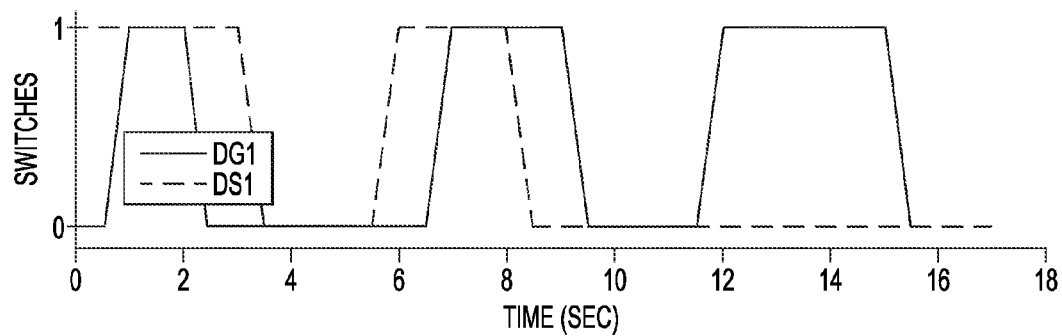
Figure 6C:
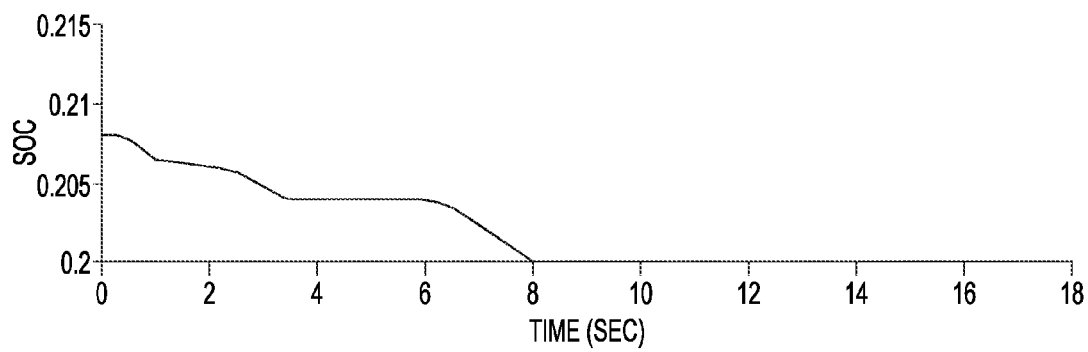

If only current information (i.e., no future information) is known, then a rule-based control can be sufficiently tuned. In this example, as shown in FIG. 6A, the power from DG1 122 and DS1 126 could support the loads 128 of FIG. 5A in full up to about 7 seconds. After that, since the battery DS1 126 is depleted after 8 seconds (FIG. 6C) and the DG1 122 power output is saturated, the power grid DG2 124 power has to be used to support the load, with some cost. This is the best result that can be achieved. In this simple example, a "rule-based" control with sufficient tuning can achieve the same level of performance as the hybrid MPC as provided by the apparatus 2 of FIG. 1.

EXAMPLE 2

Figure 7A:
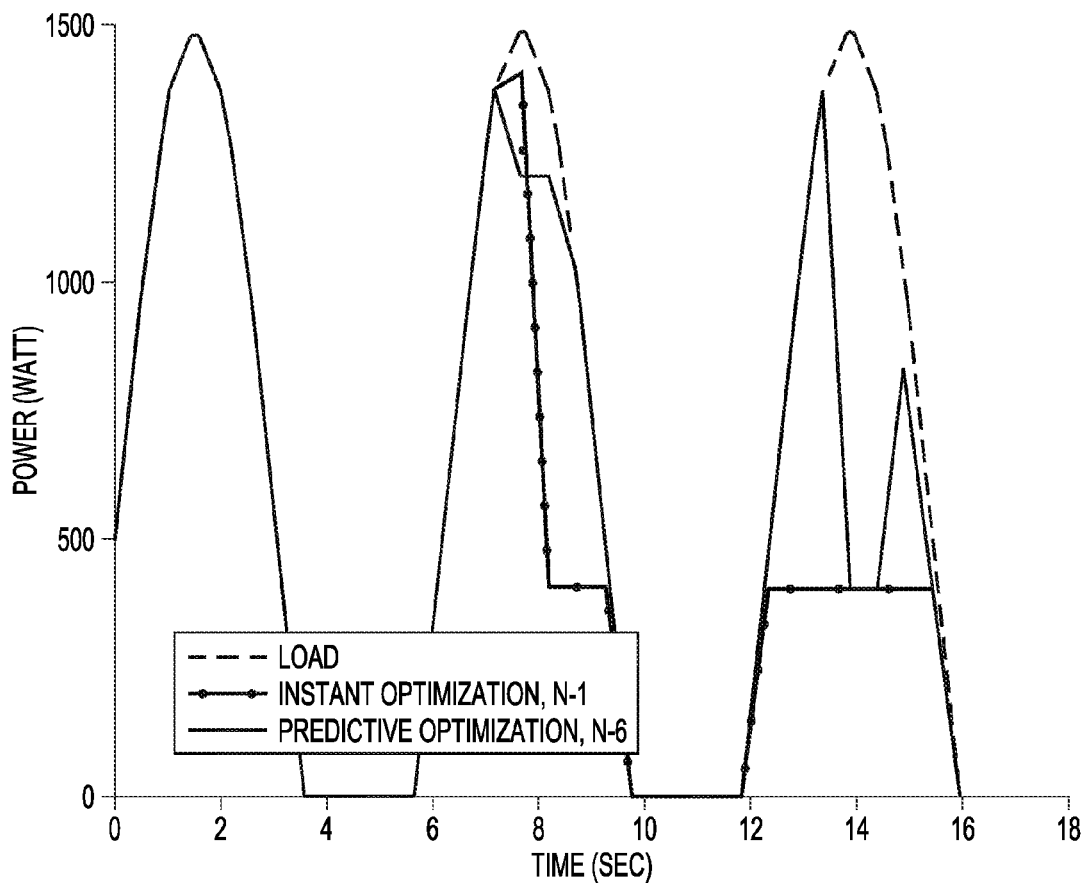
FIGS. 7A-7C are plots of power versus time, normalized cost versus prediction horizon, and state of charge (SOC) versus time, respectively, for a micro-grid system.
Figure 7B:
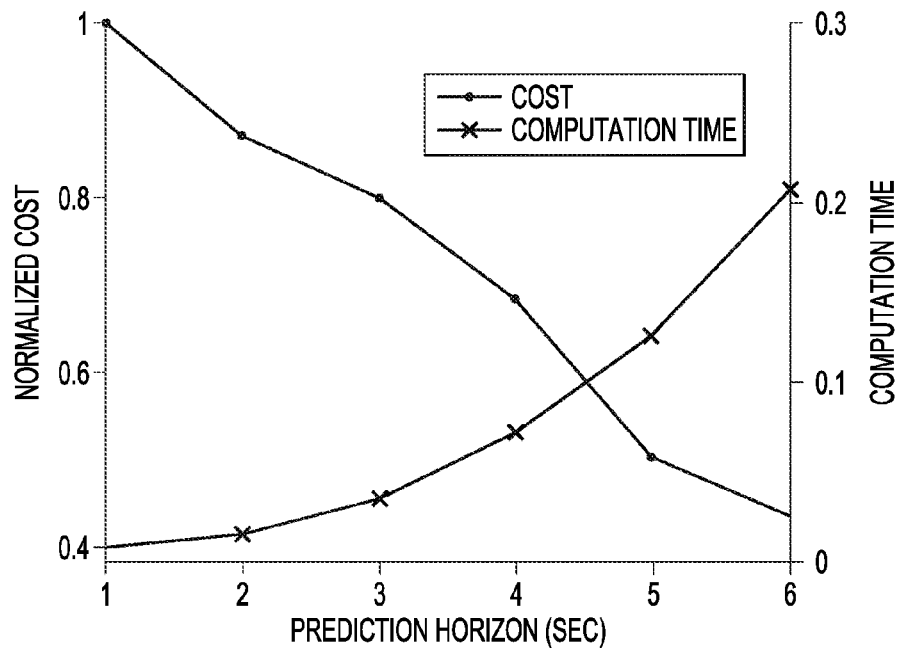
Figure 7C:
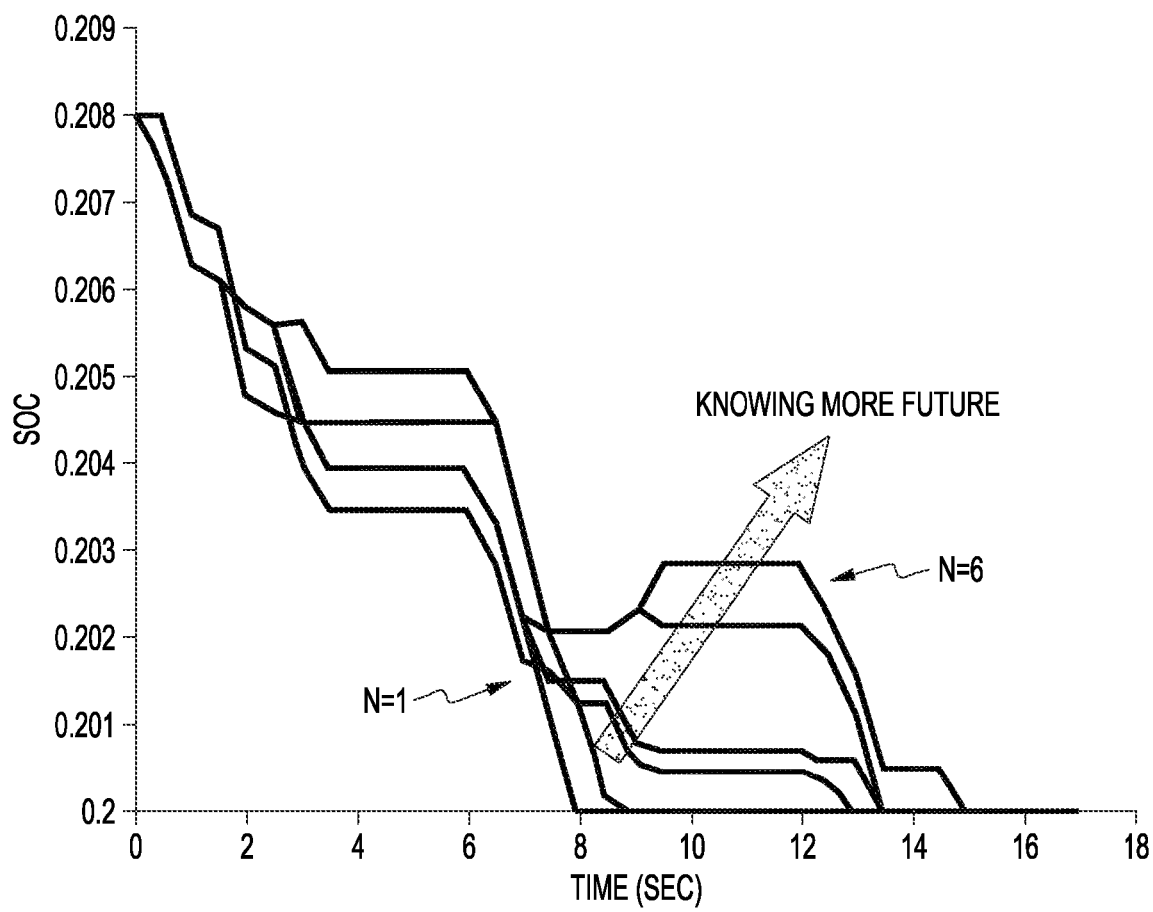

Referring to FIGS. 7A-7C, unlike Example 1, if the future load is known (e.g., in many situations, loads can be quite repetitive), then the hybrid MPC as provided by the apparatus 2 of FIG. 1 can further reduce the cost. In FIG. 7A, if the load is known in advance for 6 seconds (e.g., as shown by the plot for predictive optimization, N=6), then more load could be supported by the wind turbine DG1 122 of FIG. 5A, which is "free" of cost. The more of the future load that is known (e.g., the prediction horizon is increased from 1 second to 6 seconds), then the cost is less, as is shown in FIG. 7B. However, this also shows that the computation time increases by knowing more of the future information (e.g., as the prediction horizon is similarly increased from 1 second to 6 seconds). FIG. 7A plots the load, the first optimization without future prediction (N=1) (N=1 means only use "current" measurement; N=0 means only use "past" measurement), and the second optimization with future prediction (N=6)

FIG. 7C shows why this is happening and plots the state-of-charge (SOC) of the battery DS1 126 of FIG. 5A. Knowing the future better helps to more wisely use energy stored in the battery DS1 126. Sometimes, for example, the micro-grid system 120 of FIG. 5A charges the battery 126 first before using this battery.

EXAMPLE 3

Examples of hybrid power system components can include power sources (unidirectional), such as power grids, internal combustion engines (ICEs) and photovoltaic panels; power stores (bidirectional), such as batteries, accumulators and ultra-capacitors that can be both charged and discharged; and power loads (unidirectional), such as torque demands and HVAC. Also, some power grids can be bidirectional and can either source or sink power depending upon conditions in the hybrid power system.

A micro-grid is a cluster of distributed generation (DG), distributed storage (DS) and loads, serviced by a distribution system, and can operate in a grid-connected mode, an islanded (autonomous) mode, and a ride-though between the two modes. The control objectives for power management include reliability, power quality, and efficiency.

Micro-grids have an unknown, and somewhat repetitive duty cycle, and are characterized by both continuous and discrete events (e.g., mode switching) and a relatively large time-scale.

Inputs to the apparatus 2 of FIG. 1 can include present and forecast information of customer loads, present and forecast information of variable power sources, and present price information from the energy market. Outputs from the apparatus 2 can include load level demand response control, dispatchable source control, and improving or exporting power control.

EXAMPLE 4

Figure 8A:
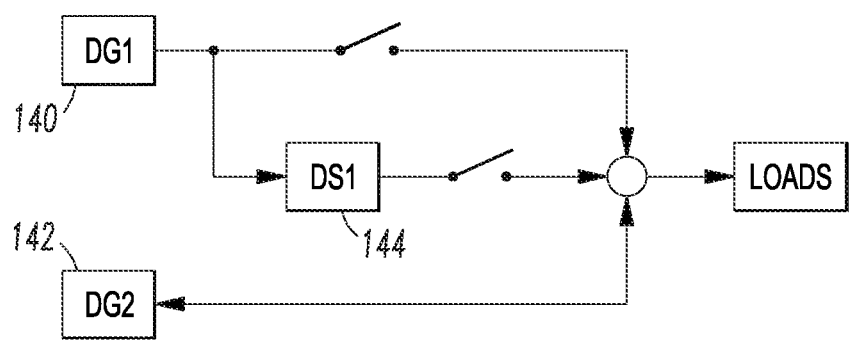
FIG. 8A is a block diagram of another micro-grid.
Figure 8B:
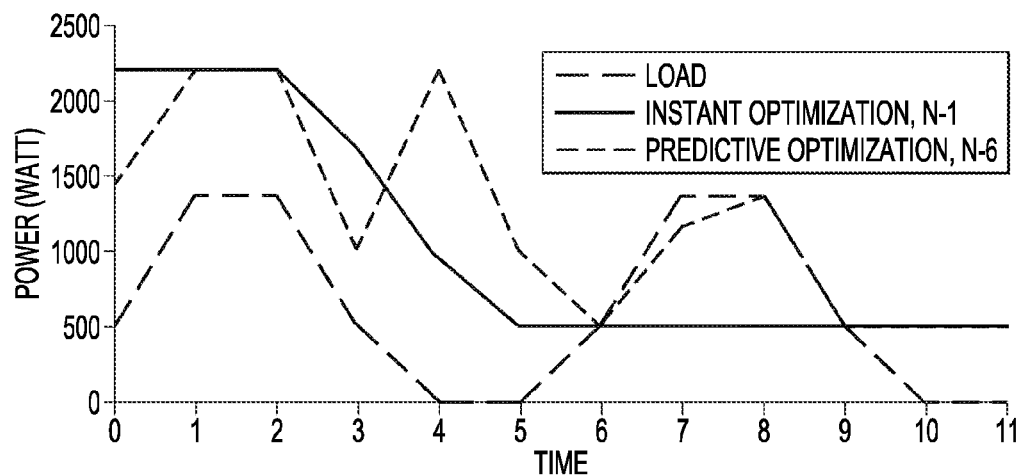
FIGS. 8B-8D are plots of power versus time, state of charge (SOC) versus time, and normalized cost versus prediction horizon, respectively, for the micro-grid of FIG. 8A.
Figure 8C:
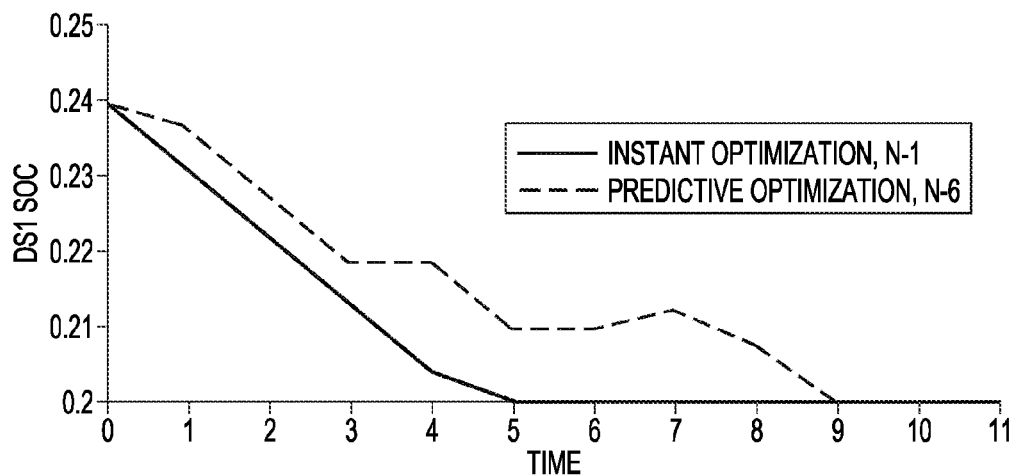
Figure 8D:
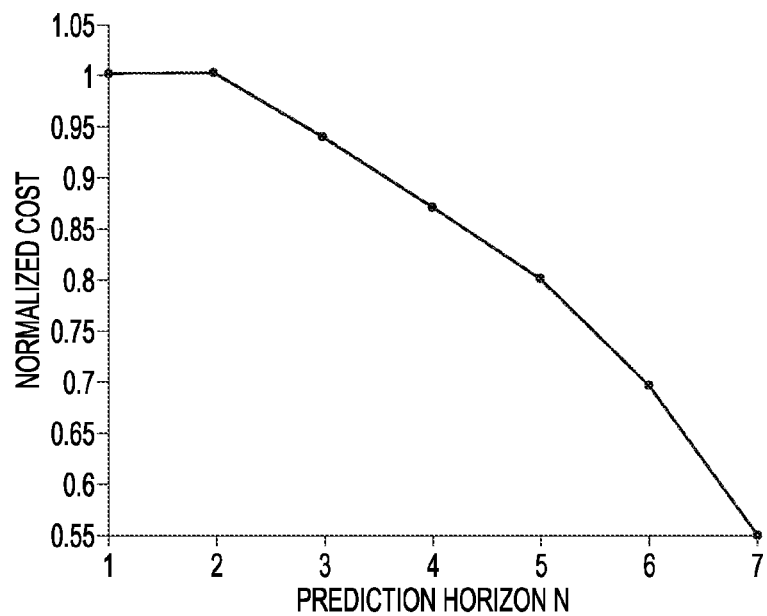

FIGS. 8A-8C show real-time adjusting of a control parameter, in order to provide real-time pricing of utility power. Similar to Example 1, there are two power sources DG1 140 and DG2 142, and one power storage system DS1 144. Here, extra power is sold to DG2 142 based upon real-time pricing, with goals to both meet time-varying loads and maximize profit. Here, the optimal control formulation automatically adjusts the power management strategy to minimize cost. A "rule-based" control formulation cannot accommodate real-time automatic parameter tuning FIG. 8D shows that the normalized cost decreases as the prediction horizon is increased from 2 seconds (N=2) to 7 seconds (N=7).

EXAMPLE 5

Figure 9A:
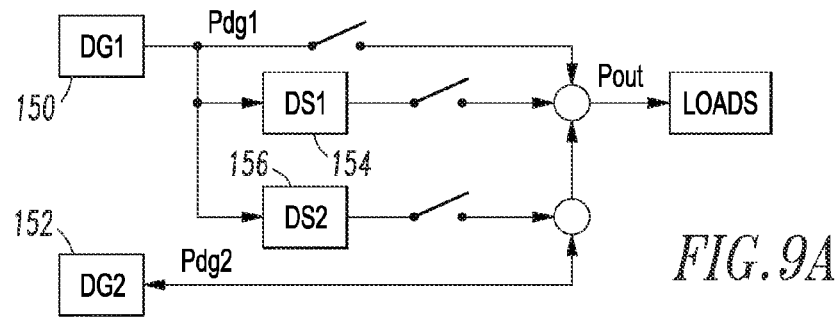
FIG. 9A is a block diagram of another micro-grid.
Figure 9B:
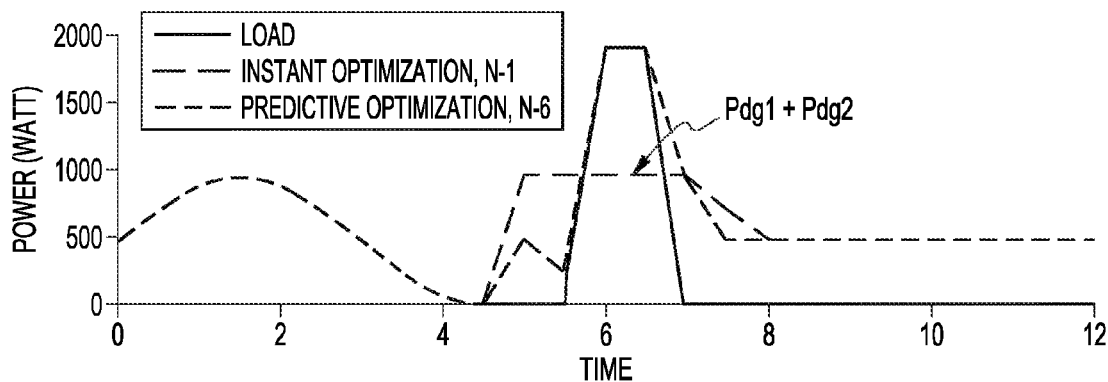
FIGS. 9B-9E are plots of power versus time, state of charge (SOC) versus time for one battery, state of charge (SOC) versus time for another battery, and normalized cost versus prediction horizon, respectively, for the micro-grid of FIG. 9A.
Figure 9C:
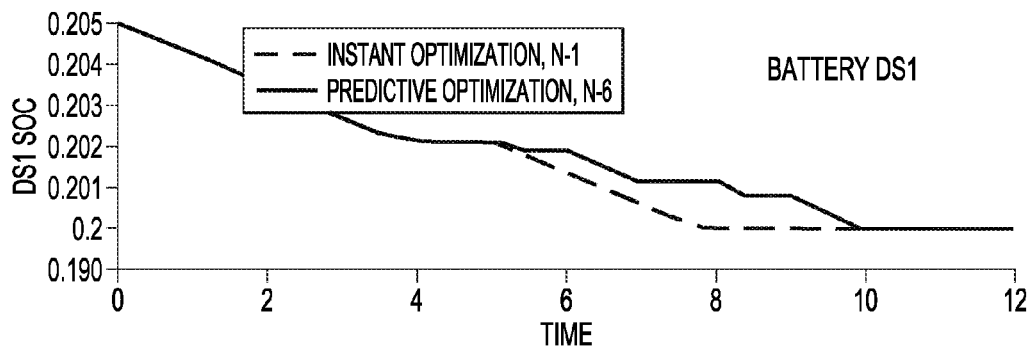
Figure 9D:
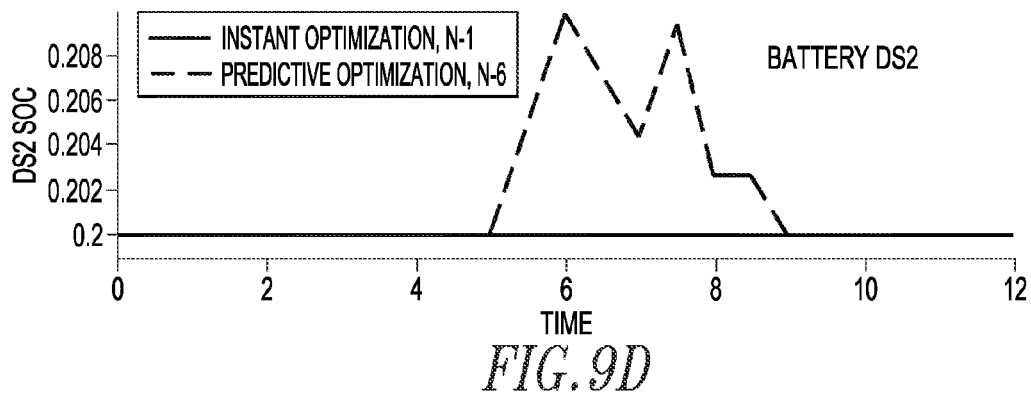
Figure 9E:
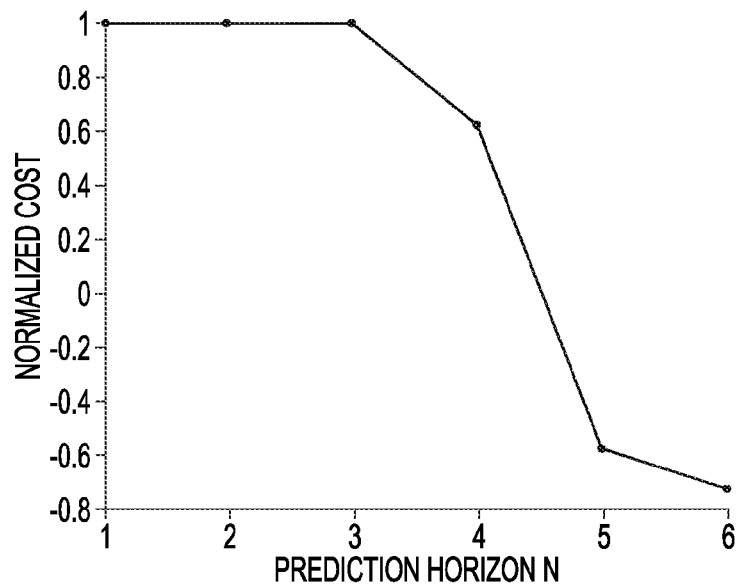

FIGS. 9A-9D show real-time adjusting of a control parameter, in order to provide real-time pricing of utility power. Similar to Example 4, there are two power sources DG1 150 and DG2 152, while in FIG. 9A there are two power storage systems DS1 154 and DS2 156. In this example, DS1 154 is a relatively slow response, low power and high energy store, while DS2 156 is a relatively fast response, high power and low energy store. Again, extra power is sold to DG2 152 based upon real-time pricing, with goals to both meet time-varying loads and maximize profit. An optimal control formulation adjusts to new system dynamics through modifying model parameters. A "rule-based" control formulation cannot adjust and would have to be completely redesigned. FIG. 9E shows that the normalized cost decreases as the prediction horizon is increased from 3 seconds (N=3) to 6 seconds (N=6).

EXAMPLE 6

Figure 10A:
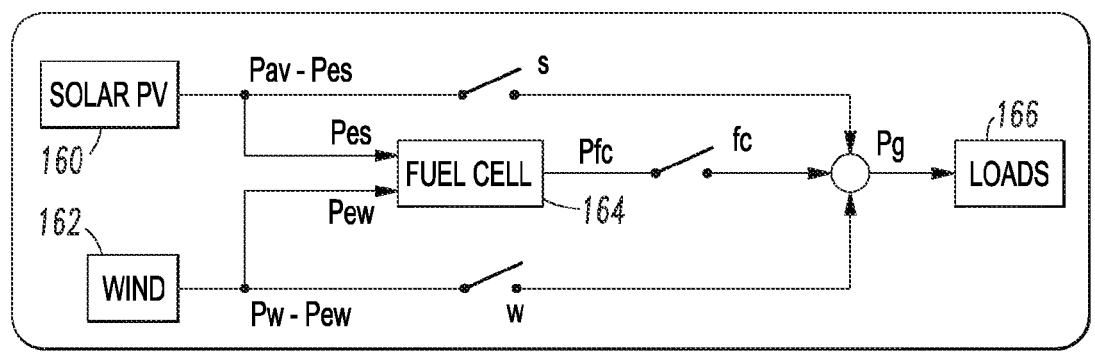
FIG. 10A is a block diagram of another micro-grid including decision variables.
Figure 10B:
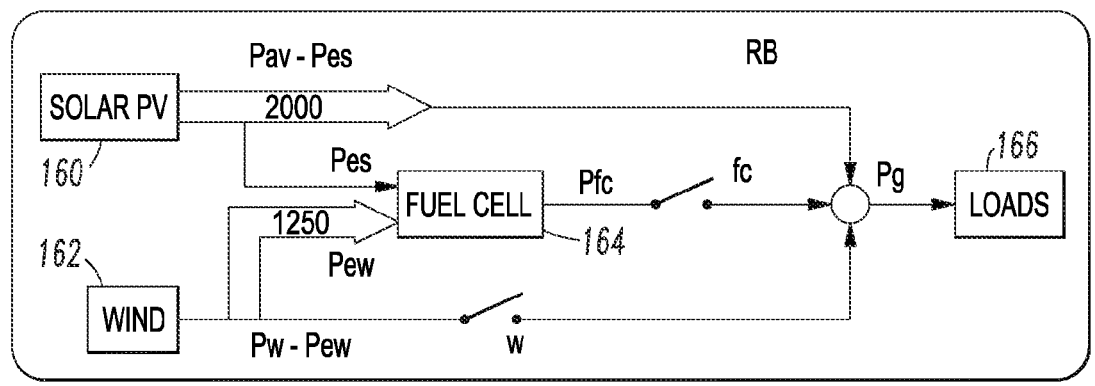
FIG. 10B is a block diagram of the micro-grid of FIG. 10A including rule-based (RB) control.
Figure 10C:
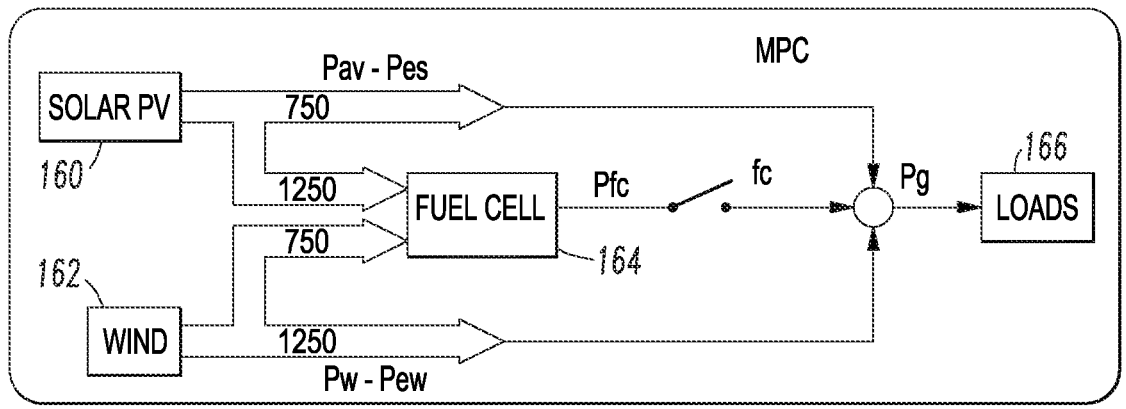
FIG. 10C is a block diagram of the micro-grid of FIG. 10A including hybrid model predictive control (MPC) in accordance with an embodiment of the disclosed concept.

FIGS. 10A and 10C show a hybrid MPC as provided by the apparatus 2 of FIG. 1 including a solar PV power source 160, a wind power source 162, a fuel cell 164 and loads 166. FIG. 10B shows conventional rule-based (RB) control. The decision variables used in the hybrid MPC include three switch states s, fc and w, and three power variables Pes (power from the solar PV to the fuel cell), Pew (power from the wind power source to the fuel cell) and Pfc (power from the fuel cell). Here, Pay (power from the solar PV)=2000 kW, Pw (power from the wind power source)=2000 kW, and Pgref (power reference for power to the loads 168)=2000 kW. This hybrid MPC charges the fuel cell 164 faster in FIG. 10C due to Pes saturation at Pes<=1250 kW. The RB control of FIG. 10B does not use power from the solar PV power source 160 to charge the fuel cell 164. However, fine tuning of the RB control can fix this.

Figure 10D:
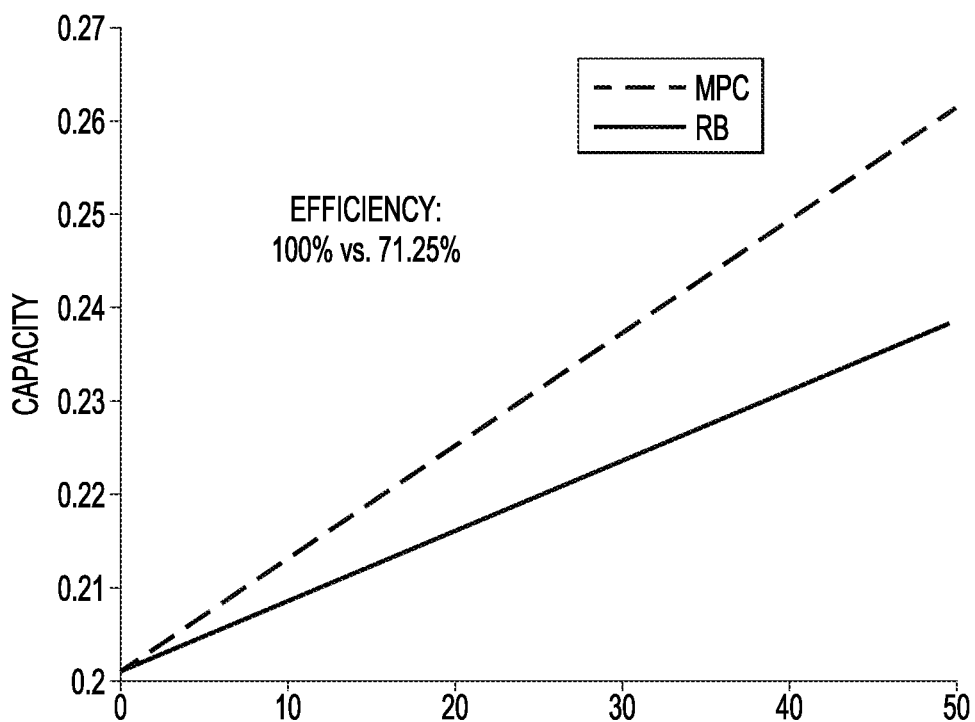
FIG. 10D is a plot of efficiency versus time for the micro-grids of FIGS. 10B and 10C.

FIG. 10D shows that the capacity or hydrogen level of the fuel cell 164 changes over time. Since RB control does not use power from the solar PV power source 160, it charges the fuel cell 164 at a slower rate. Compared with full power charging using hybrid MPC, only 71.25% of the available power is utilized for this particular example.

EXAMPLE 7

Non-limiting examples of measurements include power flow at each component (kW), wind speed and sun emissions.

EXAMPLE 8

A hybrid model for a hybrid power system (hybrid MPC) can be constructed using a Hybrid Systems Description Language (HYSDEL) from a simplified and linearized model of a plant for analysis and control design. Based on this model, the hybrid MPC, which uses mixed integer quadratic programming (MIQP), can be applied to optimize the power sources and load management. The main idea is to setup a finite-horizon optimal control problem for the hybrid system by optimizing a performance index under operating constraints. Reachability and piecewise quadratic Lyapunov stability can also be employed.

A simulation for a hybrid power system can be provided using MATLAB/Simulink and can include: seasonal variation of sun emissions over one year; wind speed distribution over one year; a simulation module for power sources (e.g., without limitation, wind turbine; photovoltaic panel; battery bank); a simulation module for loads (e.g., without limitation, air conditioner; heater; washing machine); and interconnection of different modules.

EXAMPLE 9

Figure 11A:
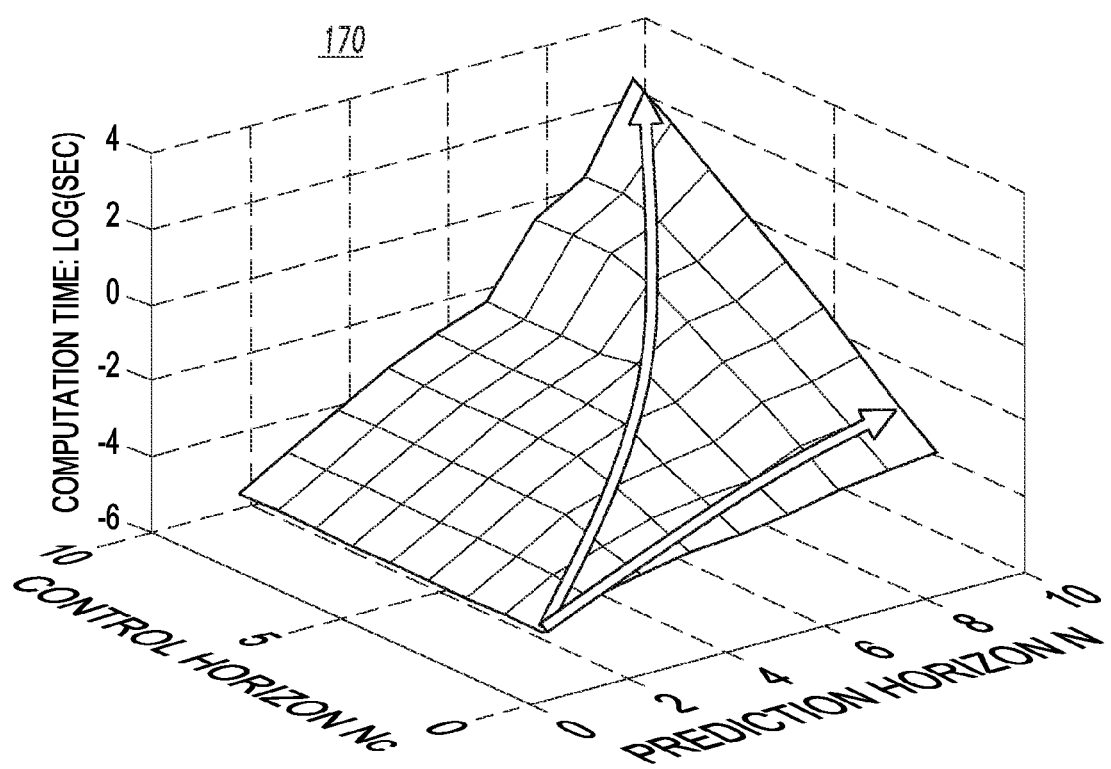
FIG. 11A is a three-dimensional plot including a prediction horizon reflecting increasing future information on a first axis, a control horizon reflecting increasing control information on a second axis, and a log of computation time on a third axis.
Figure 11B:
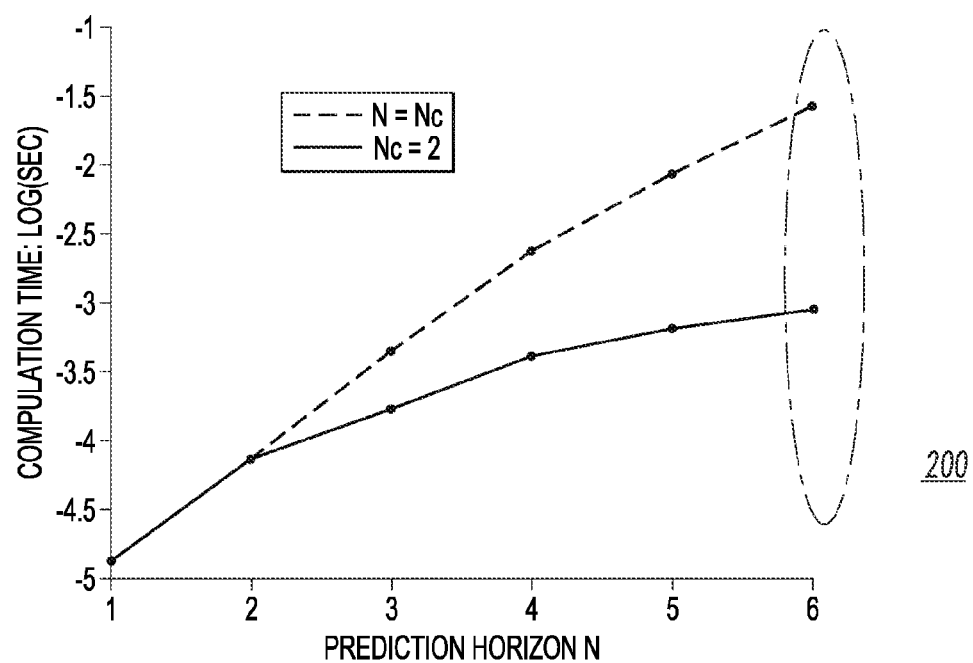
FIG. 11B is a plot of the log of computation time versus the prediction horizon of FIG. 11A as plotted for both increasing prediction and control horizons, and increasing prediction horizon and a fixed control horizon.
Figure 11C:
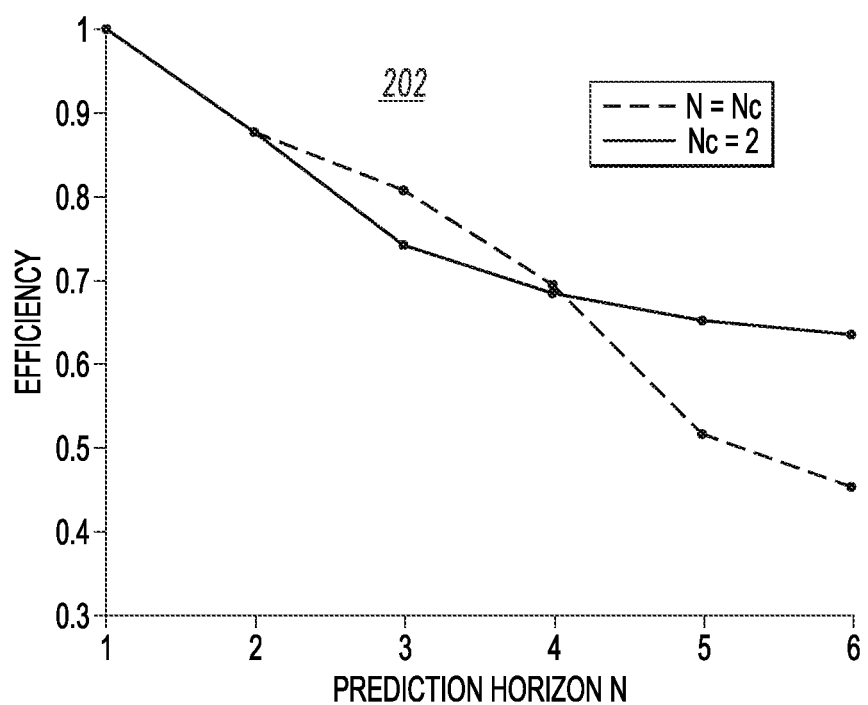
FIG. 11C is a plot of efficiency versus the prediction horizon of FIG. 11A as plotted for both increasing prediction and control horizons, and increasing prediction horizon and a fixed control horizon.

FIGS. 11A-11C show that by reducing the control design freedom, computation time is effectively reduced. In FIG. 11A, a three-dimensional plot 170 includes a prediction horizon (N) reflecting increasing future information on a first axis, a control horizon (Nc) reflecting increasing control information on a second axis, and computation time (log (seconds)) on a third axis. For example, computation time rises exponentially for increasing N=Nc as shown in FIG. 11A, and as shown in the log(seconds) plot 200 of FIG. 11B. Otherwise, for a prediction horizon of N=6, and a control horizon of Nc=2, the computation time is reduced to 20% of the computation time for the prediction horizon of N=6 and the control horizon of Nc=6. Similarly, as shown in the plot 202 of FIG. 11C, for a prediction horizon of N=6, and a control horizon of Nc=2, the fuel consumption of generators is about 63% as contrasted with the fuel consumption of generators of about 45% for the prediction horizon of N=6 and the control horizon of Nc=6. This permits real-time processing of the online optimization for the hybrid MPC as provided by the apparatus 2 of FIG. 1.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An apparatus for optimizing a hybrid power system with respect to long-term characteristics of said hybrid power system, said apparatus comprising:
a real-time controller of said hybrid power system; and
a processor cooperating with said real-time controller, said processor being structured to input current measurements of information from said hybrid power system and hybrid dynamics information including continuous dynamics and discrete time dynamics that model said hybrid power system, provide online optimization of said hybrid power system based upon said input, and output a power flow reference and a number of switch controls to said real-time controller based upon said online optimization,
wherein said processor is further structured to provide at least one of: real-time forecasts or real-time prediction of future information operatively associated with said hybrid power system as part of said input, and real-time processing of said online optimization.

2. The apparatus of claim 1 wherein the future information is selected from a group consisting of weather forecasts, future electricity price information, and future load demand information.

3. The apparatus of claim 1 wherein the discrete time dynamics is selected from a group consisting of discrete switch status and discrete mode switching information.

4. The apparatus of claim 1 wherein the continuous dynamics comprises differential equations.

5. The apparatus of claim 1 wherein the online optimization comprises input of a plurality of discrete and continuous sensor measurements of said hybrid power system, a database, and a numerical solver.

6. The apparatus of claim 1 wherein the real-time prediction of future information comprises at least one of load demand prediction, electricity price prediction, and weather prediction.

7. The apparatus of claim 6 wherein the load prediction comprises a load database, a machine learning algorithm, and a load demand prediction output.

8. The apparatus of claim 6 wherein the load prediction comprises a plurality of load values with respect to time and a load demand prediction output.

9. The apparatus of claim 1 wherein the hybrid power system is selected from a group consisting of a hybrid electric vehicle, a hybrid hydraulic vehicle, a distributed shipboard electric power system, and a micro-grid system.

10. A method of optimizing a hybrid power system with respect to long-term characteristics of said hybrid power system, said method comprising: inputting current measurements of information from said hybrid power system and hybrid dynamics information including continuous dynamics and discrete time dynamics that model said hybrid power system;
providing online optimization of said hybrid power system with a processor based upon said inputting;
outputting a power flow reference and a number of switch controls to a real-time controller based upon said online optimization; and
providing at least one of: real-time forecasts or real-time prediction of future information operatively associated with said hybrid power system as part of said inputting, and real-time processing of said online optimization.

11. The method of claim 10 further comprising: employing the future information selected from a group consisting of weather forecasts, future electricity price information, and future load demand information.

12. The method of claim 10 further comprising: employing the discrete time dynamics selected from a group consisting of discrete switch status and discrete mode switching information.

13. The method of claim 10 further comprising: employing differential equations as part of the continuous dynamics.

14. The method of claim 10 further comprising: employing with the online optimization inputting a plurality of discrete and continuous sensor measurements of said hybrid power system, employing a database, and employing a numerical solver.

15. The method of claim 10 further comprising: employing at least one of load demand prediction, electricity price prediction, and weather prediction as the real-time prediction of future information.

16. The method of claim 15 further comprising: employing with the load prediction a load database, a machine learning algorithm, and a load demand prediction output.

17. The method of claim 15 further comprising: employing with the load prediction a plurality of load values with respect to time and a load demand prediction output.

18. The method of claim 10 further comprising: employing said hybrid power system selected from a group consisting of a hybrid electric vehicle, a hybrid hydraulic vehicle, a distributed shipboard electric power system, and a micro-grid system.

* * * * *